US012407736B2

(12) United States Patent
Wakudkar et al.

(10) Patent No.: US 12,407,736 B2
(45) Date of Patent: *Sep. 2, 2025

(54) DYNAMICALLY ENFORCING SECURITY POLICIES ON CLIENT DEVICES USING A DEVICE IDENTITY ENTITY AND A SECURITY POLICY ENFORCEMENT ENTITY

(71) Applicant: Cisco Technology, Inc., San Jose, CA (US)

(72) Inventors: Sachin Dinkar Wakudkar, St-Sulpice (CH); Roberto Muccifora, Ropraz (CH); Fnu Sandesh, Hunsur (IN); Shiva Prasad Maheshuni, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,432

(22) Filed: Jun. 25, 2024

(65) Prior Publication Data

US 2024/0348662 A1  Oct. 17, 2024

Related U.S. Application Data

(63) Continuation of application No. 17/487,260, filed on Sep. 28, 2021, now Pat. No. 12,047,420.

(51) Int. Cl.
*H04L 9/40* (2022.01)
(52) U.S. Cl.
CPC ............ *H04L 63/20* (2013.01); *H04L 63/102* (2013.01)

(58) Field of Classification Search
CPC ...... H04L 63/20; H04L 63/102; H04W 12/08; H04W 12/71; H04W 12/72
See application file for complete search history.

(56) References Cited

U.S. PATENT DOCUMENTS 10,470,102 B2 * 11/2019 Keidar ................ H04L 63/0227
11,238,683 B1 * 2/2022 Mars .................... H04W 12/084
(Continued)

FOREIGN PATENT DOCUMENTS

CN     111698248 A  *  9/2020
CN     111698248 B      9/2020

OTHER PUBLICATIONS

Office Action for U.S. Appl. No. 17/487,260, filed Oct. 23, 2023, Sachin Dinkar Wakudkar, Dynamically Enforcing Security Policies On Client Devices Using a Device Identity Entity and a Security Policy Enforcement Entity, 14 Pages.

*Primary Examiner* — Mohammed Waliullah
(74) *Attorney, Agent, or Firm* — Lee & Hayes, P.C.

(57) ABSTRACT

Techniques and architecture are described for determining an identity of a client device and utilizing security policies associated with the client device provided by a device identity entity. For example, a tag associated with security policies is created for use in enforcing the security policies by a security policy enforcement entity associated with a cloud network. The techniques and architecture also allow for identification of a particular user on a client device that may be shared by multiple users based at least in part on the user accessing an application. Also, the techniques and architecture described herein provide a generic and agnostic approach to enforcing security policies for users and/or client devices.

20 Claims, 5 Drawing Sheets

(56) References Cited

U.S. PATENT DOCUMENTS

| | | |
|---|---|---|
| 2018/0262505 A1* | 9/2018 | Ligatti ................ H04L 63/0853 |
| 2019/0102162 A1 | 4/2019 | Pitre et al. |
| 2019/0149514 A1 | 5/2019 | Jawahar |
| 2019/0261169 A1 | 8/2019 | Kamal et al. |
| 2020/0163013 A1 | 5/2020 | Grayson et al. |
| 2020/0267555 A1 | 8/2020 | Grayson et al. |
| 2022/0322471 A1* | 10/2022 | Li ........................ H04W 24/02 |
| 2023/0099666 A1 | 3/2023 | Wakudkar |

\* cited by examiner

DYNAMICALLY ENFORCING SECURITY POLICIES ON CLIENT DEVICES USING A DEVICE IDENTITY ENTITY AND A SECURITY POLICY ENFORCEMENT ENTITY

CROSS-REFERENCE TO RELATED APPLICATION

This patent application is a continuation of and claims priority to U.S. patent application Ser. No. 17/487,260, filed Sep. 28, 2021, which is fully incorporated herein by reference.

TECHNICAL FIELD

The present disclosure relates generally to dynamically enforcing security policies on client devices when a user is operating a client device remotely, and more particularly to dynamically enforcing security policies on client devices using dynamically enforcing security policies on client devices using a security policy enforcement entity and a device identity entity profile associated with a client device.

BACKGROUND

There has been a trend of more workers working remotely. Thus, more organizations are moving to a work model environment where networking and security converge together in a cloud network arrangement. Device identity entities such as, for example, the Open Roaming federation, enable users to seamlessly and securely onboard to Wi-Fi networks, thus providing an always connected experience. However, it is critical to enforce security policies on user/client devices from cloud networks dynamically based on the user/client device location, the type of device, and the number of devices connected to a cloud network. Indeed, with recent trends, many users are working remotely from home and it is anticipated that such trends may continue, with many users continuing to work remotely from home.

Often, client devices at home are shared and thus it is critical that security policies are enforced based on who is actually using the client device, i.e., which user is actually using the client device. Thus, it is necessary to have a mechanism to enforce access policies based on the user that is currently using a particular client device. In particular, it is necessary to enforce policies based on the identity, location and posture of a user/client device dynamically from the cloud network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for determining an identity of a client device and utilizing security policies associated with the client device provided by a device identity entity and creating a tag associated with security policies for use in enforcing the security policies by a security policy enforcement entity associated with a cloud network. The techniques and architecture also allow for identification of a particular user on a client device that may be shared by multiple users based at least in part on the user accessing an application. Also, the techniques and architecture described herein provide a generic and agnostic approach to enforcing security policies for users and/or client devices.

In particular, a client device may access or associate to a local access network (LAN) with an association request. In configurations, the local access network is a wireless local access network. The access network may be accessed by the client device utilizing a profile or credentials provided by a device identity entity. The client device may access the access network via an access point, e.g., a Wi-Fi router, which forwards the association request and credentials from the client device to a wireless LAN controller (WLC). In configurations the local access network may be a wired network and the access point may use a wired connection between the client device and the access point. The controller would be a LAN controller in such configurations.

The WLC may provide the association request to the device identity entity within a cloud network. During authentication of the client device, the device identity entity validates the identity of the client device. Upon authentication of the client device, the device identity entity forwards the association request and credentials to an identity provider (IDP) located within the cloud network. Based at least in part on the credentials, the IDP authenticates the user associated with the client device and retrieves security policies associated with the user. The IDP then creates a tag for the user/client device and pushes the security policies along with the tag to a security policy enforcement entity of the cloud network. Thus, the security policy enforcement entity of the cloud network now has a tag and the associated security policies for the client device. The IDP also returns the tag to the device identity entity. The device identity entity forwards the tag to the WLC in an access accept message.

When the client device initiates a domain name service query, e.g., attempts to access a network site via the cloud network, the WLC incorporates the tag into the DNS queries that are forwarded to the security policy enforcement entity. The security policy enforcement entity enforces the security policies within the cloud network based on the tag.

In configurations, the security policy enforcement may be based at least in part on a location from which a query or request is originating, e.g., where is the DNS query originating from and/or where is the access request coming from. Additionally, the security policy enforcement may also be based at least in part on the type of client device making the query or request. For example, the type of device may comprise one or more of a smart phone, a laptop computer, a tablet computer, a smartbook, a palmtop computer, a desktop computer, a gaming console, an Internet of Things (IoT) device, and/or a vendor of the client device. Additionally, the security policy enforcement may also be based on a number of client devices allowed per user identity. For example, the user may be limited to only having one, two, three, etc., client devices accessing the cloud network at the same time.

In configurations, the client device may be associated with multiple users. When a particular user uses the client device to access an application using a user identification (user ID), the credentials related to the identity of the client device may be inserted into the access of the application by the user in such situations. The IDP may determine the identity of the user of the client device based at least in part on the user ID being used to access the application. In particular, when a user accesses the application, the application may check if there is a profile, e.g., credentials, present on the client device associated with the device identity entity. The profile may then be inserted into the application access request along with the user ID. The IDP may then use the information and communicate to the security policy enforcement entity in order to obtain the security policies associated with the user for the client device and create the tag as previously described. In configurations, a change of authorization (CoA) may be sent from the IDP/device identity entity to the WLC to update a previously created tag with respect to the identity/client device.

In configurations where there is no profile associated with a device identity entity, the IDP may create specific user tags for the security policy enforcement entity. The tags may be related to a profile of the user and/or the client device with respect to the security policy enforcement entity.

For example, a method may include receiving, at an identity provider from a device identity entity, an access request by a client device to access a cloud network via an access network. The access request includes credentials related to an identity of the client device from the device identity entity. The method may further include based at least in part on (i) the credentials related to an identity of the client device and (ii) an identity of a user of the client device, retrieving, by the identity provider, security policies associated with the user. The method may also include generating, by the identity provider, a tag for the client device, wherein the security policies are associated with the tag. The method may additionally include forwarding, by the identity provider to a security policy enforcement entity of the cloud network, the tag and the associated security policies and forwarding, by the identity provider to the device identity entity, the tag. The method my further include receiving, by the security policy enforcement entity from a controller of the access network, an access request associated with the client device to access the cloud network, wherein the access request includes the tag. The method may also include based at least in part on the tag, enforcing, by the security policy enforcement entity, the security policies associated with the user while the client device accesses the cloud network.

In configurations, the method may include forwarding, by the device identity entity to the controller of the access network, the tag. The method may further include receiving, by the controller of the access network from the client device, the access request associated with the client device to access the cloud network and adding, by the controller of the access network, the tag to the access request.

In configurations where the client device is associated with multiple users, the user is one of the multiple users and the access request is based upon the user accessing an application using a user identification (ID), and the credentials related to the identity of the client device are inserted into the access of the application by the user, the method may include determining, by the identity provider, the identity of the user of the client device based at least in part on the user ID.

The techniques described herein may be performed by a system and/or device having non-transitory computer-readable media storing computer-executable instructions that, when executed by one or more processors, performs the method described above.

Example Embodiments

As previously noted, in configurations, a client device may access or associate to a local access network (LAN) with an association request. In configurations, the local access network is a wireless local access network. The access network may be accessed by the client device utilizing a profile or credentials provided by a device identity entity. The client device may access the access network via an access point, e.g., a Wi-Fi router, which forwards the association request and credentials from the client device to a wireless LAN controller (WLC). In configurations the local access network may be a wired network and the access point may use a wired connection between the client device and the access point. The controller would be a LAN controller in such configurations.

As previously noted, the WLC may provide the association request to the device identity entity within a cloud network. During authentication of the client device, the device identity entity validates the identity of the client device. Upon authentication of the client device, the device identity entity forwards the association request and credentials to an identity provider (IDP) located within the cloud network. Based at least in part on the credentials, the IDP authenticates the user associated with the client device and retrieves security policies associated with the user. The IDP then creates a tag for the user/client device and pushes the security policies along with the tag to a security policy enforcement entity of the cloud network. Thus, the security policy enforcement entity of the cloud network now has a tag and the associated security policies for the client device. The IDP also returns the tag to the device identity entity. The device identity entity forwards the tag to the WLC in an access accept message.

When the client device initiates a domain name service query, e.g., attempts to access a network site via the cloud network, the WLC incorporates the tag into the DNS queries that are forwarded to the security policy enforcement entity. The security policy enforcement entity enforces the security policies within the cloud network based on the tag.

In configurations, the security policy enforcement may be based at least in part on a location from which a query or request is originating, e.g., where is the DNS query originating from and/or where is the access request coming from. Additionally, the security policy enforcement may also be based at least in part on the type of client device making the query or request. For example, the type of device may comprise one or more of a smart phone, a laptop computer, a tablet computer, a smartbook, a palmtop computer, a desktop computer, a gaming console, an Internet of Things (IoT) device, and/or a vendor of the client device. Additionally, the security policy enforcement may also be based on a number of client devices allowed per user identity. For example, the user may be limited to only having one, two, three, etc., client devices accessing the cloud network at the same time.

In configurations, the client device may be associated with multiple users. When a particular user uses the client device to access an application using a user identification (user ID), the credentials related to the identity of the client device may be inserted into the access of the application by the user in such situations. The IDP may determine the identity of the user of the client device based at least in part on the user ID being used to access the application. In particular, when a user accesses the application, the application may check if there is a profile, e.g., credentials, present on the client device associated with the device identity entity. The profile may then be inserted into the application access request along with the user ID. The IDP may then use the information and communicate to the security policy enforcement entity in order to obtain the security policies associated with the user for the client device and create the tag as previously described. In configurations, a change of authorization (COA) may be sent from the IDP/device identity entity to the WLC to update a previously created tag.

In configurations where there is no profile associated with a device identity entity, the IDP may create specific user tags for the security policy enforcement entity. The tags may be related to a profile of the user and/or the client device with respect to the security policy enforcement entity.

An example of a device identity entity includes the OpenRoaming™ Federation. The Wireless Broadband Alliance (WBA) launched OpenRoaming™ OpenRoaming™ is an effort to address the fundamental Wi-Fi connectivity issues highlighted above and is led by many key industry players. OpenRoaming is a simple but powerful concept. It brings together Wi-Fi Access Network Providers (ANPs) and Identity Providers (IDPs) under a Public Key Infrastructure (PKI) based trust model through the WBA Roaming Federation (also referred to as the OpenRoaming™ Federation). Any Wi-Fi ANP, big or small, can be part of the federation and securely connect with the IDPs based on the PKI model. OpenRoaming™ connects ANPs with IDPs and creates a global network of Wi-Fi networks in a seamless and secure fashion. With OpenRoaming™, users no longer need to go through cumbersome and confusing public Wi-Fi network connectivity experiences. Instead, OpenRoaming™ provides a simple auto connection and seamless Wi-Fi access for users and makes connecting to Wi-Fi on mobile devices act more like cellular access.

With OpenRoaming™, client devices use Wi-Fi profiles to connect to Wi-Fi networks. Before a client device can connect to a Wi-Fi network, the client device needs to go through an onboarding process. OpenRoaming™ allows client device vendors to get their client devices out-of-the-box ready for the one global OpenRoaming™ Wi-Fi network, without depending on an ANP's online sign up system. Additionally, OpenRoaming™ provides a global legal framework for acceptance of terms and conditions applicable for its usage. These terms and conditions are delivered during the onboarding of the client devices, removing the need to prompt the user for acceptance for each Wi-Fi network users try to access. With OpenRoaming™, a client device only needs to complete this onboarding process once and it can be completed by either the client device manufacturer or the user. The onboarding process requires manufacturers or users enter in an ID from an OpenRoaming™ IDP and to accept the terms and conditions for OpenRoaming™ usage.

After a client device has an ID from an OpenRoaming™ IDP, the client device is ready for OpenRoaming™ networks connection. When the client device discovers there is an available OpenRoaming™ Wi-Fi network nearby through the RCOIs, the client device initiates a secure authentication with the access network using the information in the OpenRoaming™ profile associated with the client device. The device then sends the Network Access Identifier (NAI) realm of the IDP to the ANP.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
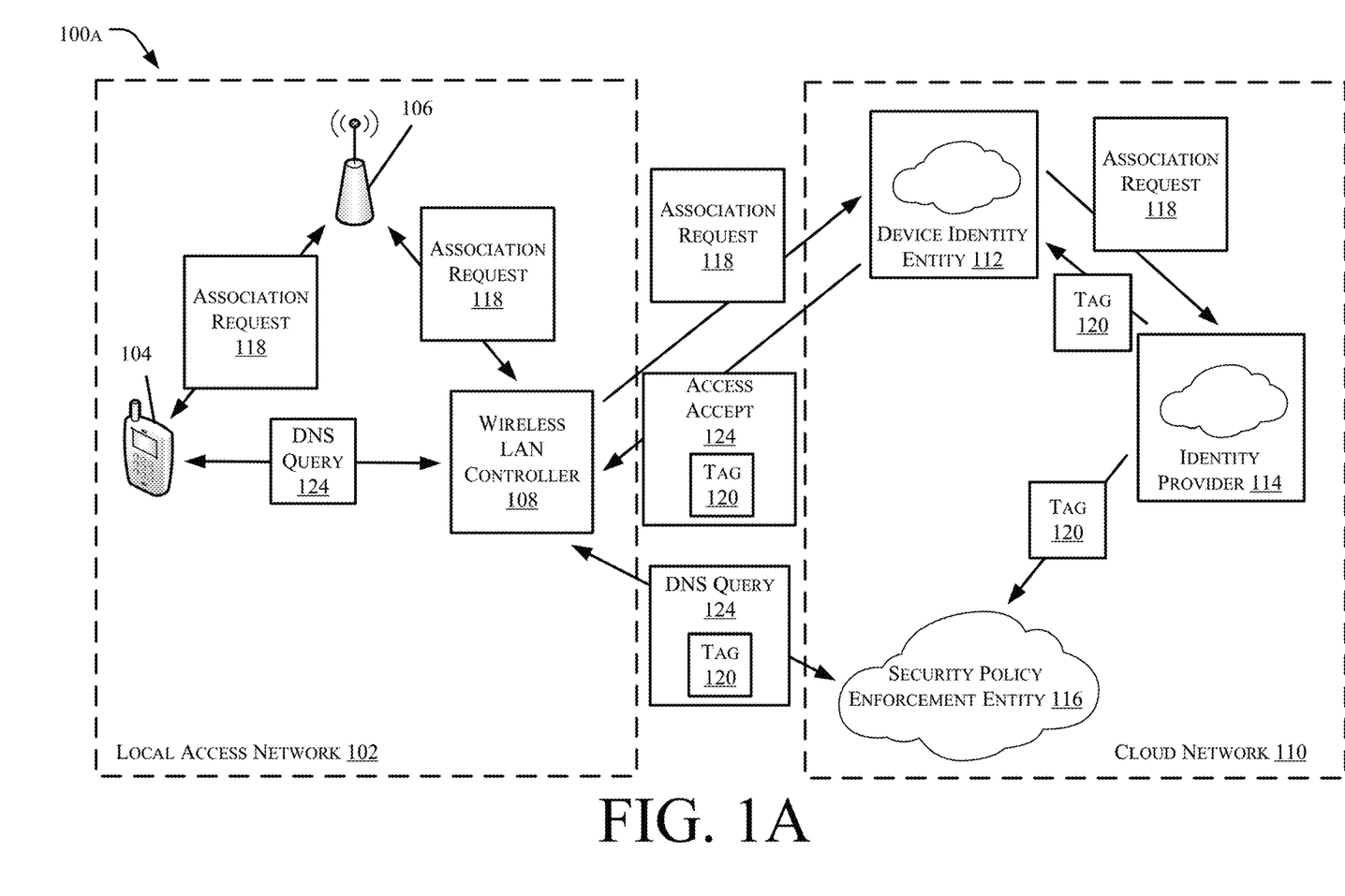
FIGS. 1A-1C schematically illustrate example arrangements of networks that include a client device accessing a local access network in order to access a cloud network, where security policies are dynamically enforced on the client device using a security policy enforcement entity and a device identity entity profile associated with the client device.

FIG. 1A schematically illustrates an example arrangement 100a that includes a local access network (LAN) 102. A client device 104 is included in the local access network 102. In configurations, the local access network 102 is a wireless local access network. The local access network 102 includes an access point 106 and a wireless LAN controller (WLC) 108. In configurations the local access network 102 may be a wired network and the access point 106 may use a wired connection between the client device 104 and the access point 106. The wireless LAN controller 108 would be a LAN controller in such configurations.

The arrangement 100a illustrated in FIG. 1A also schematically illustrates a cloud network 110. The cloud network 110 includes a device identity entity 112 and an identity provider (IDP) 114. The cloud network 110 further includes a security policy enforcement entity 116. An example of a security policy enforcement entity 116 is Cisco Umbrella. As previously noted, an example of the device identity entity 112 is the OpenRoaming™ Federation.

In configurations, the client device 104 may access or associate to the local access network 102 with an association or access request 118. The local access network 102 may be accessed by the client device 104 utilizing a profile or credentials provided by the device identity entity 112, which may be included in the association request 118. The client device 104 may access the local access network 102 via the access point 106, e.g., a Wi-Fi router, which forwards the association request 118 and credentials from the client device 104 to the wireless LAN controller 108.

In configurations, the wireless LAN controller 108 may provide the association request 118 to the device identity entity 112 within the cloud network 110. During authentication of the client device 104 by the device identity entity 112, the device identity entity 112 validates the identity of the client device 104. Upon authentication of the client device 104, the device identity entity 112 forwards the association request 118 and credentials to the identity provider 114 located within the cloud network 110. Based at least in part on the credentials, the IDP 114 authenticates a user associated with the client device 104 and retrieves security policies associated with the user. In configurations, the IDP 114 retrieves security policies associated with the user that are stored at the IDP 114. In configurations, the security policies may be stored elsewhere.

The IDP 114 then creates a tag 120 for the user/client device 104 and pushes the security policies along with the tag 120 to the security policy enforcement entity 116 associated with the cloud network 110. Thus, the security policy enforcement entity 116 associated with the cloud network 110 now has the tag 120 and the associated security policies for the client device 104. The IDP 114 also returns the tag 120 to the device identity entity 112. The device identity entity 112 forwards the tag 120 to the WLC 108 in an access accept message 122.

When the client device 104 initiates a domain name service query (DNS) 124, e.g., attempts to access a network site via the cloud network 110, the WLC 108 incorporates the tag 120 into the DNS queries 124 that are forwarded to the security policy enforcement entity 116. The security policy enforcement entity 116 enforces the security policies within the cloud network 110 based on the tag 120.

In configurations, the security policy enforcement may be based at least in part on a location from which a query or request is originating, e.g., where is the DNS query 124 originating from and/or where is the association request 118 coming from. Additionally, the security policy enforcement may also be based at least in part on the type of client device 104 making the DNS query 124 or association request 118. For example, the type of client device 104 may comprise one or more of a smart phone, a laptop computer, a tablet computer, a smartbook, a palmtop computer, a desktop computer, a gaming console, an Internet of Things (IoT) device, and/or a vendor of the client device. Additionally, the security policy enforcement may also be based on a number of client devices 104 allowed per user identity. For example, the user may be limited to only having one, two, three, etc., client devices 104 accessing the cloud network 110 at the same time.

Figure 1B:
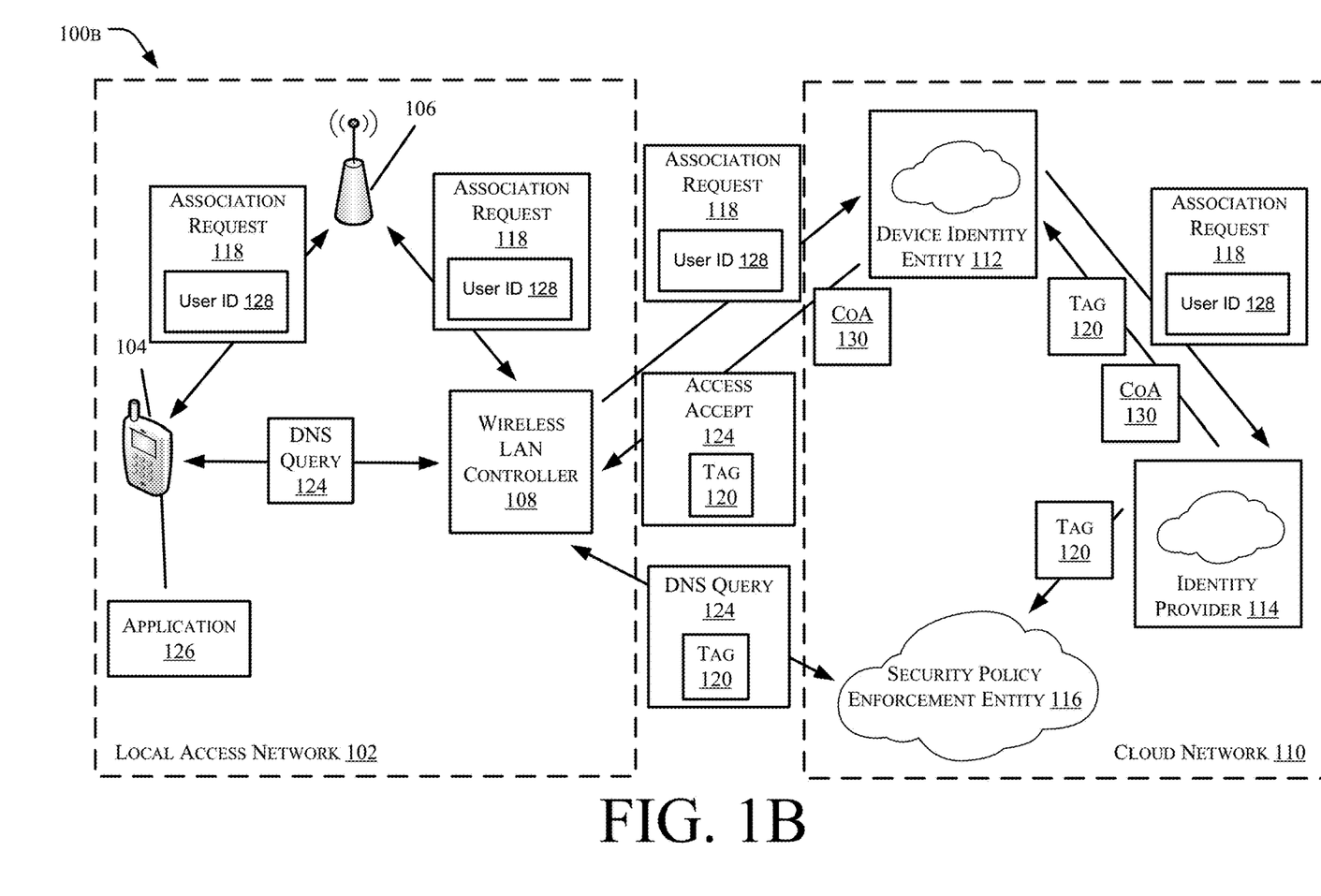

Referring to FIG. 1B, in configurations, the client device 104 may be associated with multiple users. When a particular user uses the client device 104 to access an application 126 using a user identification (user ID), the profile or credentials provided by the device identity entity 112 related to the identity of the client device 104 may be inserted into the access of the application 126 in such situations.

FIG. 1B schematically illustrates an example arrangement 100b that includes the local access network (LAN) 102. The client device 104 is included in the local access network 102. The local access network 102 includes the access point 106 and the wireless LAN controller (WLC) 108. In configurations the local access network 102 may be a wired network and the access point 106 may use a wired connection between the client device 104 and the access point 106. As previously noted, the wireless LAN controller 108 would be a LAN controller in such configurations.

The arrangement 100b illustrated in FIG. 1B also schematically illustrates the cloud network 110. The cloud network 110 includes the device identity entity 112 and the identity provider (IDP) 114. The cloud network 110 further includes the security policy enforcement entity 116. As previously noted, an example of the security policy enforcement entity 116 is Cisco Umbrella. As previously noted, an example of the device identity entity 112 is the OpenRoaming™ Federation.

As previously noted, in configurations, the client device 104 may access or associate to the local access network 102 with an association or access request 118. The access or association request may be via an application access request by the client device 104 to access the application 126, as will be described further herein. The local access network 102 may be accessed by the client device 104 utilizing a profile or credentials provided by the device identity entity 112, which may be included in the association request 118. The client device 104 may access the local access network 102 via the access point 106, e.g., a Wi-Fi router, which forwards the association request 118 and credentials from the client device 104 to the wireless LAN controller 108.

The wireless LAN controller 108 may provide the association request 118 to the device identity entity 112 within the cloud network 110. During authentication of the client device 104 by the device identity entity 112, the device identity entity 112 validates the identity of the client device 104. Upon authentication of the client device 104, the device identity entity 112 forwards the association request 118 and credentials to the identity provider 114 located within the cloud network 110. Based at least in part on the credentials, the IDP 114 authenticates a user associated with the client device 104 and retrieves security policies associated with the user. In configurations, the IDP 114 retrieves security policies associated with the user that are stored at the IDP 114. In configurations, the security policies may be stored elsewhere.

The IDP 114 then creates a tag 120 for the user/client device 104 and pushes the security policies along with the tag 120 to the security policy enforcement entity 116 associated with the cloud network 110. Thus, the security policy enforcement entity 116 associated with the cloud network 110 now has the tag 120 and the associated security policies for the client device 104. The IDP 114 also returns the tag 120 to the device identity entity 112. The device identity entity 112 forwards the tag 120 to the WLC 108 in an access accept message 122.

When the client device 104 initiates a domain name service query (DNS) 124, e.g., attempts to access a network site via the cloud network 110, the WLC 108 incorporates the tag 120 into the DNS queries 124 that are forwarded to the security policy enforcement entity 116. The security policy enforcement entity 116 enforces the security policies within the cloud network 110 based on the tag 120.

As previously noted, in configurations, the security policy enforcement may be based at least in part on a location from which a query or request is originating, e.g., where is the DNS query 124 originating from and/or where is the association request 118 coming from. Additionally, the security policy enforcement may also be based at least in part on the type of client device 104 making the DNS query 124 or association request 118. For example, the type of client device 104 may comprise one or more of a smart phone, a laptop computer, a tablet computer, a smartbook, a palmtop computer, a desktop computer, a gaming console, an Internet of Things (IoT) device, and/or a vendor of the client device. Additionally, the security policy enforcement may also be based on a number of client devices 104 allowed per user identity. For example, the user may be limited to only having one, two, three, etc., client devices 104 accessing the cloud network 110 at the same time.

As previously noted, in configurations, the client device 104 may be associated with multiple users. When a particular user uses the client device 104 to access the application 126 using a user identification (user ID) 128 via the association request 118, the credentials related to the identity of the client device 104 from the device identity 112 and the user ID 128 may be inserted into the association request 118 of the application 126 in such situations. The IDP 114 may determine the identity of the user of the client device 104 based at least in part on the user ID 128 being used to access the application 126. In particular, when a user accesses the application 126, the application 126 may check if there is a profile, e.g., credentials, present on the client device 104, where the profile is associated with the device identity entity 112. The profile may then be inserted into the application access request, e.g., the association request 118, along with the user ID 128. The IDP 114 may then use the information in order to obtain the security policies associated with the current user for the client device 104 and create the tag 120 as previously described, which is provided to the security policy enforcement entity 116. In configurations, a change of authorization (CoA) 130 may be sent from the IDP 114 to the device identity entity 112, which then sends the CoA 130 to the WLC 108 to update a previously created tag 120 with respect to the client device 104 to provide the specific security policies associated with the current user for the client device 104.

Figure 1C:
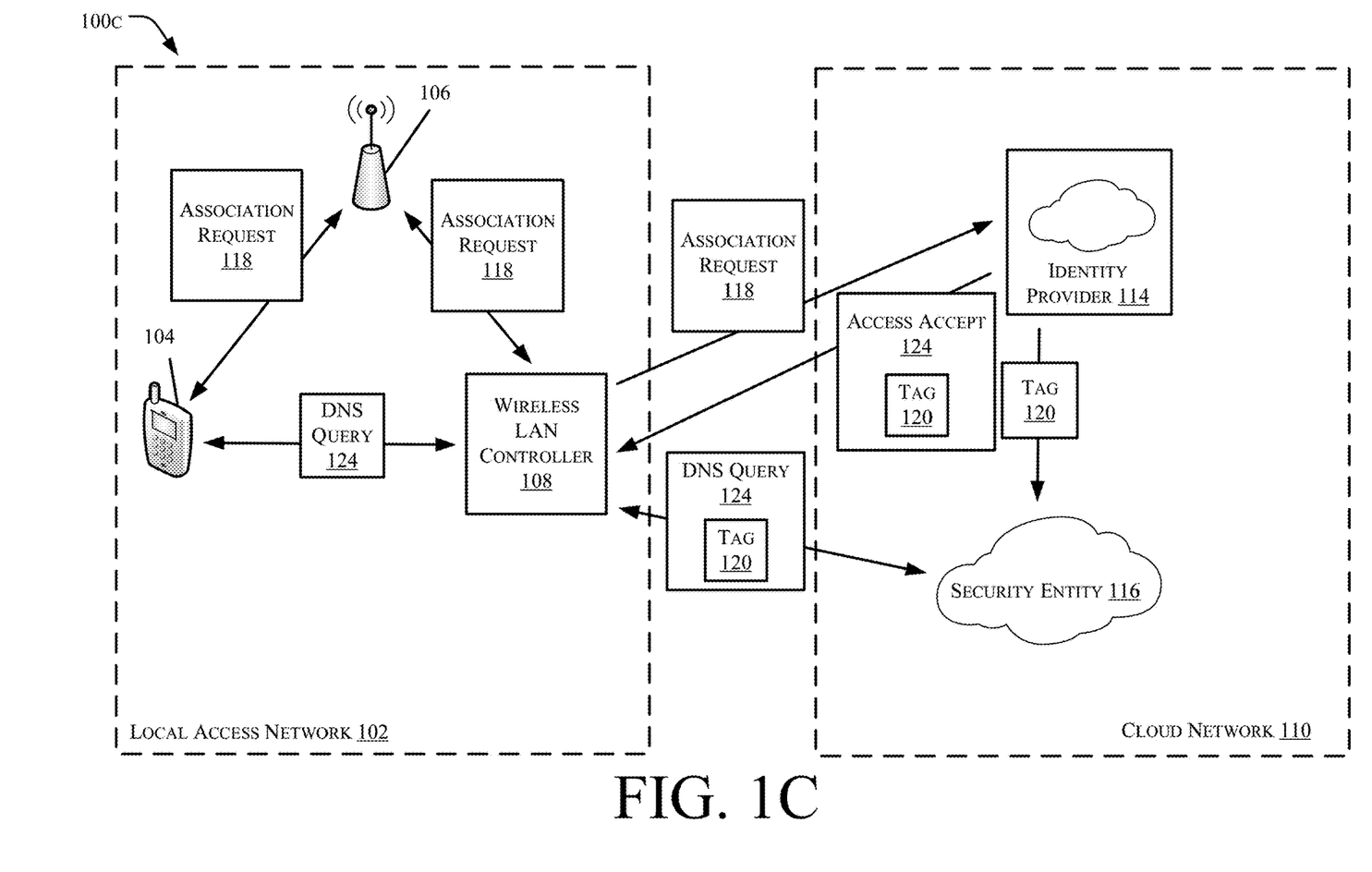

Referring to FIG. 1C, in configurations where there is no profile associated with the device identity entity 112, the IDP 114 may create specific user tags 120 for the security policy enforcement entity 116. The tags 120 may be related to a profile of the user and/or the client device 120 with respect to the security policy enforcement entity 116.

FIG. 1C schematically illustrates an example arrangement 100c that includes the local access network (LAN) 102. The client device 104 is included in the local access network 102. The local access network 102 includes the access point 106 and the wireless LAN controller (WLC) 108. In configurations the local access network 102 may be a wired network and the access point 106 may use a wired connection between the client device 104 and the access point 106. As previously noted, the wireless LAN controller 108 would be a LAN controller in such configurations.

The arrangement 100c illustrated in FIG. 1C also schematically illustrates the cloud network 110. The cloud network 110 includes the identity provider (IDP) 114. The cloud network 110 further includes the security policy enforcement entity 116. As previously noted, an example of the security policy enforcement entity 116 is Cisco Umbrella. As previously noted, an example of the device identity entity 112 is the OpenRoaming™ Federation.

In configurations, the client device 104 may access or associate to the local access network 102 with an association or access request 118. The client device 104 may access the local access network 102 via the access point 106, e.g., a Wi-Fi router, which forwards the association request 118 and credentials from the client device 104 to the wireless LAN controller 108.

The wireless LAN controller 108 may provide the association request 118 to the IDP 114 within the cloud network 110. During authentication of the client device 104 by the IDP 114, the IDP authenticates a user associated with the client device 104 and retrieves security policies associated with the user. In configurations, the IDP 114 retrieves security policies associated with the user that are stored at the IDP 114. In configurations, the security policies may be stored elsewhere.

The IDP 114 then creates a tag 120 for the user/client device 104 and pushes the security policies along with the tag 120 to the security policy enforcement entity 116 associated with the cloud network 110. Thus, the security policy enforcement entity 116 associated with the cloud network 110 now has the tag 120 and the associated security policies for the client device 104. The IDP 114 also returns the tag 120 to the WLC 108 in an access accept message 122.

When the client device 104 initiates a domain name service query (DNS) 124, e.g., attempts to access a network site via the cloud network 110, the WLC 108 incorporates the tag 120 into the DNS queries 124 that are forwarded to the security policy enforcement entity 116. The security policy enforcement entity 116 enforces the security policies within the cloud network 110 based on the tag 120.

As previously noted, in configurations, the security policy enforcement may be based at least in part on a location from which a query or request is originating, e.g., where is the DNS query 124 originating from and/or where is the association request 118 coming from. Additionally, the security policy enforcement may also be based at least in part on the type of client device 104 making the DNS query 124 or association request 118. For example, the type of client device 104 may comprise one or more of a smart phone, a laptop computer, a tablet computer, a smartbook, a palmtop computer, a desktop computer, a gaming console, an Internet of Things (IoT) device, and/or a vendor of the client device. Additionally, the security policy enforcement may also be based on a number of client devices 104 allowed per user identity. For example, the user may be limited to only having one, two, three, etc., client devices 104 accessing the cloud network 110 at the same time.

Figure 2:
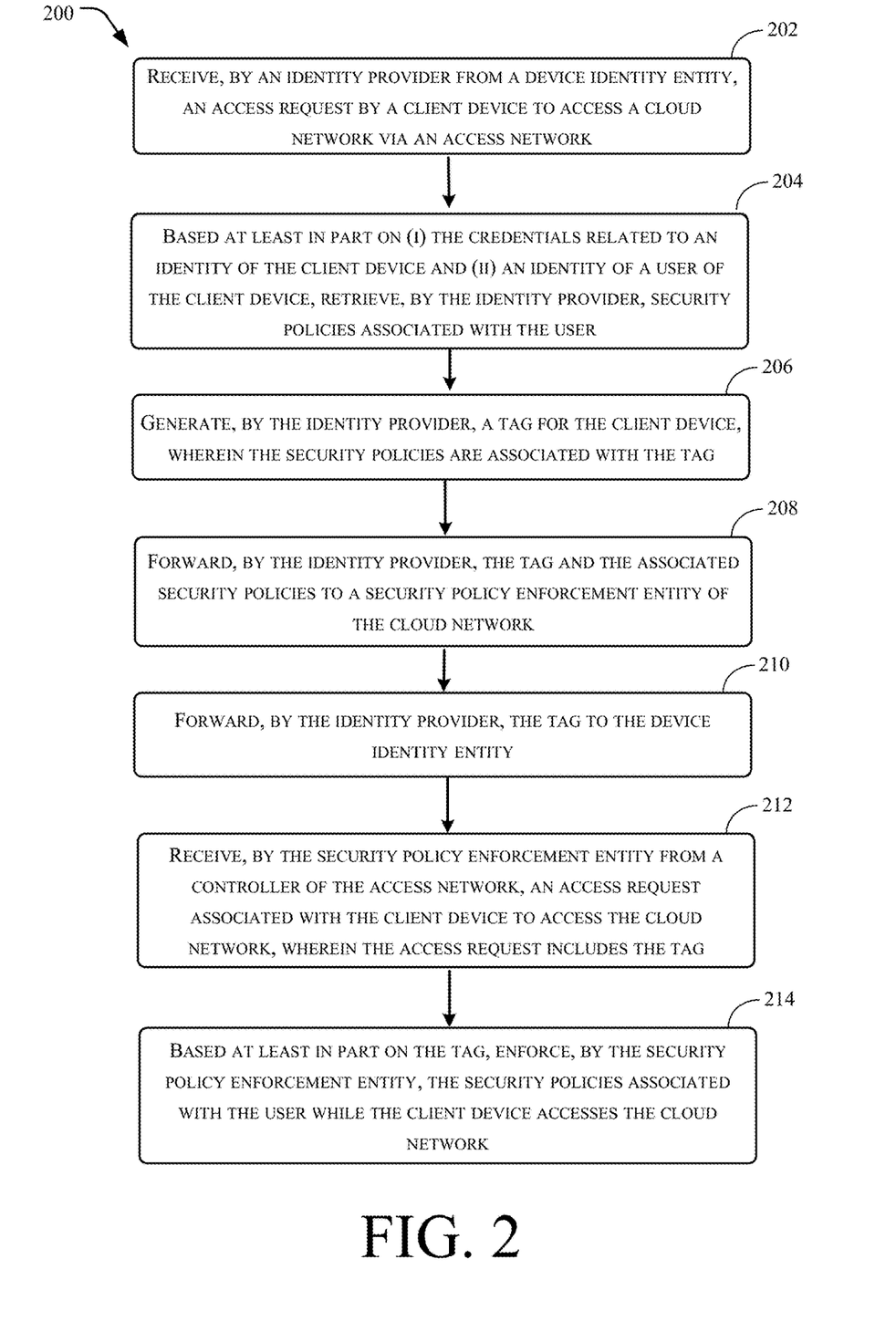
FIG. 2 illustrates a flow diagram of an example method for dynamically enforcing security policies on client devices using a security policy enforcement entity and a device identity entity profile associated with a client device.

FIG. 2 illustrates a flow diagram of example method 200 and illustrate aspects of the functions performed at least partly by a network device of a network as described with respect to FIGS. 1A, 1B, and 1C. The logical operations described herein with respect to FIG. 2 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for dynamically enforcing security policies on client devices using a security policy enforcement entity and a device identity entity profile associated with a client device. In some examples, the method 200 may be performed by a system comprising one or more processors and one or more non-transitory computer-readable media storing computer-executable instructions that, when executed by the one or more processors, cause the one or more processors to perform the method 300.

At 202, an identity provider receives, from a device identity entity, an access request by a client device to access a cloud network via an access network. The access request includes credentials related to an identity of the client device from the device identity entity. For example, the IDP 114 receives an association request 118 from the device identity entity 112. The association request 118 originated at the client device 104 and includes a profile or credentials of the client device 104 that is provided by the device identity entity 112. The client device provided the association request 118 to the access point 106 of the local access network 102. The access point 106 provided the association request 118 to the WLC 108, which provided the association request 118 to the device identity entity 112.

At 204, based at least in part on (i) the credentials related to an identity of the client device and (ii) an identity of a user of the client device, the identity provider retrieves security policies associated with the user. For example, the IDP 114 identifies a user associated with the client device 104. The IDP 114 retrieves security policies associated with the user that are stored at the IDP 114. In configurations, the security policies may be stored elsewhere.

At 206, the identity provider generates a tag for the client device, wherein the security policies are associated with the tag. For example, the IDP 114 generates a tag 120 and the security policies are associated with the tag 120.

At 208, the identity provider forwards the tag and the associated security policies to a security policy enforcement entity of the cloud network. For example, the IDP 114 forwards the tag 120 and the associated security policies to the security policy enforcement entity 116 of the cloud network 110.

At 210, the identity provider forwards the tag to the device identity entity. For example, the IDP 114 forwards the tag 120 to the device identity entity 112.

At 212, the security policy enforcement entity receives, from a controller of the access network, an access request associated with the client device to access the cloud network, wherein the access request includes the tag. For example, the security policy enforcement entity 116 receives a DNS query 124 that includes the tag 120 from the WLC 108. The DNS query 124 originated from the client device 104 for accessing a site via the cloud network 110.

At 214, based at least in part on the tag, the security policy enforcement entity enforces the security policies associated with the user while the client device accesses the cloud network. For example, the security policy enforcement entity 116 enforces the security policies associated with the user while the client device 104 accesses the cloud network 110.

Figure 3:
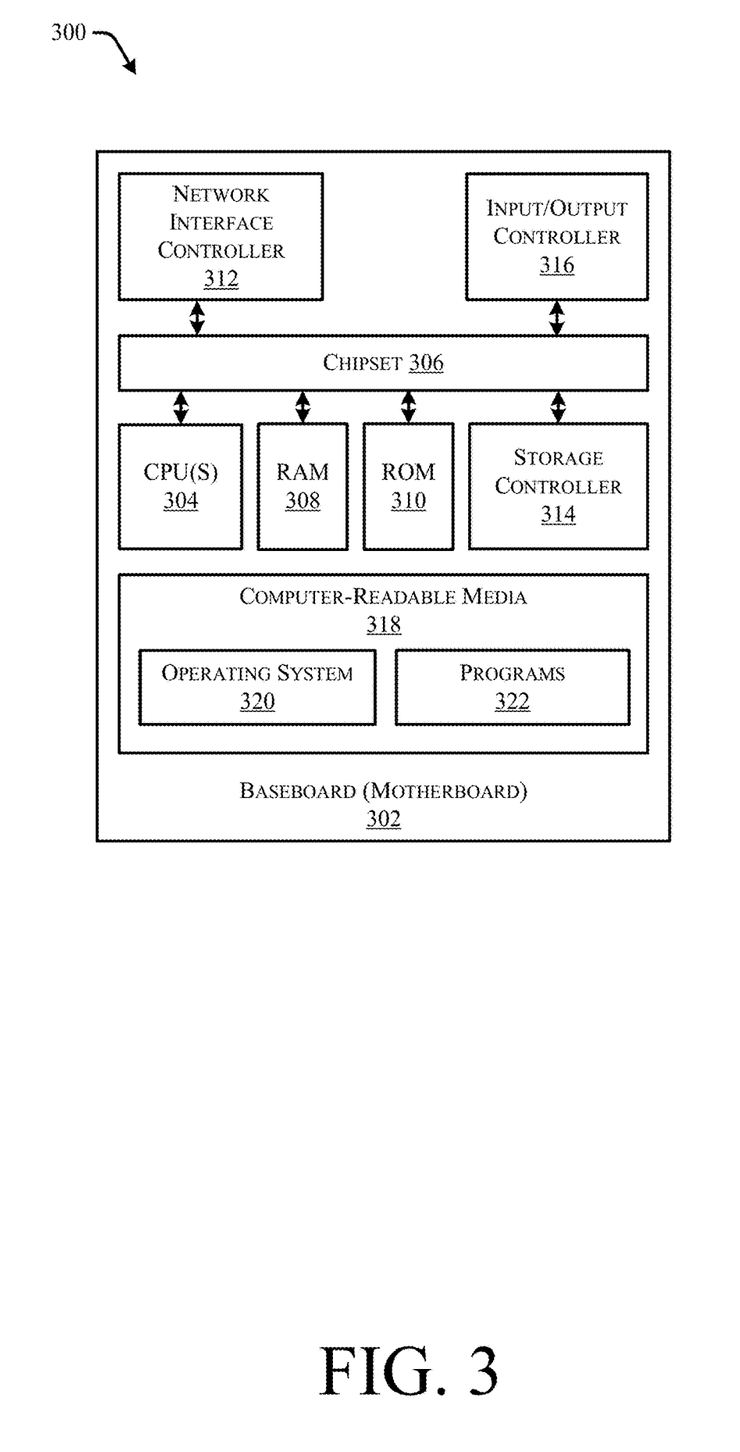
FIG. 3 is a computer architecture diagram showing an example computer hardware architecture for implementing a device that can be utilized to implement aspects of the various technologies presented herein.

FIG. 3 shows an example computer architecture for a computing device 302 capable of executing program components for implementing the functionality described above. In configurations, one or more of the computing devices 302 may be used to implement the client device 104, the WLC 108, the device identity entity 112, the IDP 114, and the security policy enforcement entity 116 for example. The computer architecture shown in FIG. 3 illustrates a conventional server computer, workstation, desktop computer, laptop, tablet, network appliance, e-reader, smartphone, or other computing device, and can be utilized to execute any of the software components presented herein. The computing device 302 may, in some examples, correspond to a physical devices or resources described herein.

The computing device 302 includes a baseboard 302, or "motherboard," which is a printed circuit board to which a multitude of components or devices can be connected by way of a system bus or other electrical communication paths. In one illustrative configuration, one or more central processing units ("CPUs") 304 operate in conjunction with a chipset 306. The CPUs 304 can be standard programmable processors that perform arithmetic and logical operations necessary for the operation of the computing device 302.

The CPUs 304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 306 provides an interface between the CPUs 304 and the remainder of the components and devices on the baseboard 302. The chipset 306 can provide an interface to a RAM 308, used as the main memory in the computing device 302. The chipset 306 can further provide an interface to a computer-readable storage medium such as a read-only memory ("ROM") 310 or non-volatile RAM ("NVRAM") for storing basic routines that help to startup the computing device 302 and to transfer information between the various components and devices. The ROM 310 or NVRAM can also store other software components necessary for the operation of the computing device 302 in accordance with the configurations described herein.

The computing device 302 can operate in a networked environment using logical connections to remote computing devices and computer systems through a network, such as the network 308. The chipset 306 can include functionality for providing network connectivity through a NIC 312, such as a gigabit Ethernet adapter. The NIC 312 is capable of connecting the computing device 302 to other computing devices over the network 308. It should be appreciated that multiple NICs 312 can be present in the computing device 302, connecting the computer to other types of networks and remote computer systems.

The computing device 302 can be connected to a storage device 318 that provides non-volatile storage for the computer. The storage device 318 can store an operating system 320, programs 322, and data, which have been described in greater detail herein. The storage device 318 can be connected to the computing device 302 through a storage controller 314 connected to the chipset 306. The storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 302 can store data on the storage device 318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 318 is characterized as primary or secondary storage, and the like.

For example, the computing device 302 can store information to the storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 302 can further read information from the storage device 318 by detecting the physical states or characteristics of one or more particular locations within the physical storage units.

In addition to the mass storage device 318 described above, the computing device 302 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 302. In some examples, the operations performed by the cloud network, and or any components included therein, may be supported by one or more devices similar to computing device 302. Stated otherwise, some or all of the operations described herein may be performed by one or more computing devices 302 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 318 can store an operating system 320 utilized to control the operation of the computing device 302. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 318 can store other system or application programs and data utilized by the computing device 302.

In one embodiment, the storage device 318 or other computer-readable storage media is encoded with computer-executable instructions which, when loaded into the computing device 302, transform the computer from a general-purpose computing system into a special-purpose computer capable of implementing the embodiments described herein. These computer-executable instructions transform the computing device 302 by specifying how the CPUs 304 transition between states, as described above. According to one embodiment, the computing device 302 has access to computer-readable storage media storing computer-executable instructions which, when executed by the computing device 302, perform the various processes described above with regard to FIGS. 1A, 1B, 1C, and 2. The computing device 302 can also include computer-readable storage media having instructions stored thereupon for performing any of the other computer-implemented operations described herein.

The computing device 302 can also include one or more input/output controllers 316 for receiving and processing input from a number of input devices, such as a keyboard, a mouse, a touchpad, a touch screen, an electronic stylus, or other type of input device. Similarly, an input/output controller 316 can provide output to a display, such as a computer monitor, a flat-panel display, a digital projector, a printer, or other type of output device. It will be appreciated that the computing device 302 might not include all of the components shown in FIG. 3, can include other components that are not explicitly shown in FIG. 3, or might utilize an architecture completely different than that shown in FIG. 3.

The computing device 302 may support a virtualization layer, such as one or more virtual resources executing on the computing device 302. In some examples, the virtualization layer may be supported by a hypervisor that provides one or more virtual machines running on the computing device 302 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at an identity provider from a device identity entity, an application access request by a client device to access a cloud network via an application over an access network, wherein the application access request includes (i) credentials related to an identity of the client device from the device identity entity and (ii) a user identification (ID) related to the application;
   based at least in part on the credentials, retrieving, by the identity provider, security policies associated with a user associated with the user ID;
   generating, by the identity provider, a tag for the client device, wherein the security policies are associated with the tag;
   forwarding, by the identity provider to a security policy enforcement entity of the cloud network, the tag and associated security policies;
   forwarding, by the identity provider to the device identity entity, the tag;
   receiving, by the security policy enforcement entity from a controller of the access network, an access request associated with the client device to access the cloud network, wherein the access request includes the tag added to the access request by the controller of the access network; and
   based at least in part on the tag, enforcing, by the security policy enforcement entity, the security policies associated with the user while the client device accesses the cloud network.

2. The method of claim 1, further comprising:
   forwarding, by the identity provider to the controller of the access network, a change of authorization (CoA) related to the tag to update the tag with respect to the user ID.

3. The method of claim 1, wherein enforcing, by the security policy enforcement entity, the security policies associated with the user while the client device accesses the cloud network is further based at least in part on a location of the client device.

4. The method of claim 1, wherein enforcing, by the security policy enforcement entity, the security policies associated with the user while the client device accesses the cloud network is further based at least in part on a type of the client device.

5. The method of claim 4, wherein the type of the client device comprises one or more from a group comprising a smartphone, a laptop computer, a tablet computer, a smartbook, a palmtop computer, a desktop computer, a gaming console, an Internet of Things (IoT) device, and a vendor of the client device.

6. The method of claim 1, wherein enforcing, by the security policy enforcement entity, the security policies associated with the user while the client device accesses the cloud network is further based at least in part on a number of client devices associated with the user.

7. The method of claim 1, further comprising:
forwarding, by the device identity entity to the controller of the access network, the tag; and
receiving, by the controller of the access network from the client device, the access request associated with the client device to access the cloud network.

8. The method of claim 1, further comprising:
based at least in part on the credentials, validating, by the identity provider, the identity of the user of the client device.

9. The method of claim 1, wherein:
the client device is associated with multiple users and the user is one of the multiple users;
the access request is based upon the user accessing an application using a user identification (ID);
the credentials related to the identity of the client device are inserted into the access of the application by the user; and
the method further comprises determining, by the identity provider, the identity of the user of the client device based at least in part on the user ID.

10. A system comprising:
one or more processors; and
one or more non-transitory computer-readable media storing computer-executable instructions that, when executed by the one or more processors, cause the one or more processors to perform actions comprising:
receiving, at an identity provider from a device identity entity, an application access request by a client device to access a cloud network via an application over an access network, wherein the application access request includes (i) credentials related to an identity of the client device from the device identity entity and (ii) a user identification (ID) related to the application;
based at least in part on the credentials, retrieving, by the identity provider, security policies associated with a user associated with the user ID;
generating, by the identity provider, a tag for the client device, wherein the security policies are associated with the tag;
forwarding, by the identity provider to a security policy enforcement entity of the cloud network, the tag and associated security policies;
forwarding, by the identity provider to the device identity entity, the tag;
receiving, by the security policy enforcement entity from a controller of the access network, an access request associated with the client device to access the cloud network, wherein the access request includes the tag added to the access request by the controller of the access network; and
based at least in part on the tag, enforcing, by the security policy enforcement entity, the security policies associated with the user while the client device accesses the cloud network.

11. The system of claim 10, further comprising:
forwarding, by the identity provider to the controller of the access network, a change of authorization (CoA) related to the tag to update the tag with respect to the user ID.

12. The system of claim 10, wherein enforcing, by the security policy enforcement entity, the security policies associated with the user while the client device accesses the cloud network is further based at least in part on a location of the client device.

13. The system of claim 10, wherein enforcing, by the security policy enforcement entity, the security policies associated with the user while the client device accesses the cloud network is further based at least in part on a type of the client device.

14. The system of claim 13, wherein the type of the client device comprises one or more from a group comprising a smartphone, a laptop computer, a tablet computer, a smartbook, a palmtop computer, a desktop computer, a gaming console, an Internet of Things (IoT) device, and a vendor of the client device.

15. The system of claim 10, wherein enforcing, by the security policy enforcement entity, the security policies associated with the user while the client device accesses the cloud network is further based at least in part on a number of client devices associated with the user.

16. The system of claim 10, further comprising:
forwarding, by the device identity entity to the controller of the access network, the tag; and
receiving, by the controller of the access network from the client device, the access request associated with the client device to access the cloud network.

17. The system of claim 10, further comprising:
based at least in part on the credentials, validating, by the identity provider, the identity of the user of the client device.

18. The system of claim 10, wherein:
the client device is associated with multiple users and the user is one of the multiple users;
the access request is based upon the user accessing an application using a user identification (ID);
the credentials related to the identity of the client device are inserted into the access of the application by the user; and
the actions further comprise determining, by the identity provider, the identity of the user of the client device based at least in part on the user ID.

19. One or more non-transitory computer-readable media storing computer-executable instructions that, when executed by one or more processors, cause the one or more processors to perform actions comprising:
receiving, at an identity provider from a device identity entity, an application access request by a client device to access a cloud network via an application over an access network, wherein the application access request includes (i) credentials related to an identity of the client device from the device identity entity and (ii) a user identification (ID) related to the application;

based at least in part on the credentials, retrieving, by the identity provider, security policies associated with a user associated with the user ID;

generating, by the identity provider, a tag for the client device, wherein the security policies are associated with the tag;

forwarding, by the identity provider to a security policy enforcement entity of the cloud network, the tag and associated security policies;

forwarding, by the identity provider to the device identity entity, the tag;

receiving, by the security policy enforcement entity from a controller of the access network, an access request associated with the client device to access the cloud network, wherein the access request includes the tag added to the access request by the controller of the access network; and based at least in part on the tag, enforcing, by the security policy enforcement entity, the security policies associated with the user while the client device accesses the cloud network.

20. The one or more non-transitory computer-readable media of claim 19, wherein the actions further comprise:

forwarding, by the identity provider to the controller of the access network, a change of authorization (CoA) related to the tag to update the tag with respect to the user ID.

* * * * *